United States Patent [19]

Kubo et al.

[11] 4,356,742
[45] Nov. 2, 1982

[54] TRANSMISSION CONTROL SYSTEM PROVIDING OVERLAPPED SHIFT LINE COMBINATIONS

[75] Inventors: Seitoku Kubo, Toyota; Koujiro Kuramochi, Okazaki; Tatsuo Kyushima, Toyota, all of Japan

[73] Assignee: Toyota Jidosha Kogyo Kabushiki Kaisha, Toyota, Japan

[21] Appl. No.: 204,037

[22] Filed: Nov. 4, 1980

[30] Foreign Application Priority Data

Apr. 15, 1980 [JP] Japan .................................. 55-50076

[51] Int. Cl.$^3$ ............................................ B60K 41/06
[52] U.S. Cl. .................................................... 74/869
[58] Field of Search ................. 74/869, 864, 868, 867; 192/0.076

[56] References Cited

U.S. PATENT DOCUMENTS

| | | | |
|---|---|---|---|
| 3,785,614 | 1/1974 | Enomoto | 74/869 X |
| 4,073,203 | 2/1978 | Wurst et al. | 74/869 X |
| 4,143,563 | 3/1979 | Shindo et al. | 74/869 X |
| 4,313,353 | 2/1982 | Honig | 74/868 |

*Primary Examiner*—George H. Krizmanich
*Attorney, Agent, or Firm*—Stevens, Davis, Miller & Mosher

[57] ABSTRACT

A fluid pressure control system for controlling an automatic transmission, which includes a gear transmission mechanism and several fluid pressure actuated friction engaging mechanisms, and which is shifted to various speed stages including an overdrive speed stage, a directly connected speed stage, and a reduction geared speed stage which is the closest speed stage below the directly connected speed stage, according to selective supply of actuating fluid pressure to the friction engaging mechanisms. The control system includes a governor pressure control valve, a throttle pressure control valve, a first shift valve for upshifting and downshifting between the directly connected speed stage and the overdrive speed stage, and a second shift valve for upshifting and downshifting between the reduction geared speed stage and the directly connected speed stage. These shift valves shift according to balance relationships between the throttle pressure and the governor pressure. The direct/overdrive shift valve has very considerable hysteresis in its operation, so that in the shift diagram the downshift line from the overdrive speed stage to the directly connected speed stage is generally to the high throttle opening low vehicle speed side of the upshift line from the reduction geared stage to the directly connected speed stage.

3 Claims, 2 Drawing Figures

TRANSMISSION CONTROL SYSTEM PROVIDING OVERLAPPED SHIFT LINE COMBINATIONS

BACKGROUND OF THE INVENTION

The present invention relates to the field of automatic transmissions for vehicles, and more particularly relates to a hydraulic pressure control system for controlling a transmission for a vehicle, said transmission having at least three speed stages, namely: a reduction geared speed stage, a directly connected speed stage, and an overdrive speed stage.

There are known various automatic transmissions for use in automotive vehicles. A typical such automatic transmission includes a gear transmission mechanism and a plurality of fluid pressure actuated friction engaging mechanisms. Selective supply of actuating fluid pressure to these friction engaging mechanisms provides various speed stages from the gear transmission mechanism. Further, various fluid pressure control systems are known for controlling such an automatic transmission, i.e., for providing supply of actuating fluid pressure to the friction engaging mechanisms. Such a fluid pressure system for an automatic transmission in general comprises: a source of fluid pressure which includes a fluid pump; a line fluid pressure control valve which modifies the fluid pressure supplied by the fluid pressure source and produces a line fluid pressure of a predetermined controlled pressure level; a throttle fluid pressure control valve, which receives supply of the line fluid pressure from the line fluid pressure control valve and which produces a throttle fluid pressure which increases in accordance with increase of the load on the engine of the vehicle, i.e., in the case of an internal combustion engine including a carburetor, in accordance with throttle opening (which is taken to be indicative of engine load); a governor fluid pressure control valve, which receives supply of line fluid pressure from the line fluid pressure control valve and which produces a governor fluid pressure which increases according to increase of the vehicle road speed; and a manual selector valve, which receives supply of the line fluid pressure from the line fluid pressure control valve, and which is controlled by the operator of the vehicle, by hand, so as to be selectively shifted between various shift ranges, such as D range, 2 range, etc.. Further, such a fluid pressure control system comprises a plurality of speed shift valves, which are shifted according to various equilibrium relationships between the governor fluid pressure and the throttle fluid pressure, so as selectively to supply actuating fluid pressures to the various friction engaging mechanisms. In such an automatic transmission, according to the driving conditions of the vehicle, i.e., according to the current values of vehicle road speed and engine load, the gear transmission mechanism is automatically shifted to the most desirable speed stage available therefrom, within the range of allowable gear shift stages which is currently manually selected by the vehicle operator on the manual selector valve.

It is general and conventional that one of the higher speed stages of such an automatic transmission should be a directly connected speed stage, i.e., a speed stage in which the gear transmission mechanism as a whole provides no increase or decrease of rotational speed. Further, such an automatic transmission also has at least one, and typically has two or three, reduction geared speed stages which are geared lower than the directly connected speed stage. These lower geared speed stages are used during acceleration of the vehicle from rest, during high acceleration at intermediate road speeds, during hill climbing or the like, of engine braking of the vehicle, and according to other particular combinations of operational conditions of the vehicle. It is also well known, and is becoming more and more frequent nowadays, for such an automatic transmission to be provided with an overdrive speed stage. When the gear transmission mechanism of the automatic transmission is set to such an overdrive speed stage, it provides an increase of rotational speed; in other words, its output shaft rotates faster than does its input shaft. This overdrive speed stage is typically the highest speed stage. As with the other speed stages, shifting of the gear transmission mechanism between the directly connected speed stage and the overdrive speed stage is controlled by a direct-/overdrive shift valve, which is supplied with the throttle pressure and the governor pressure, and which shifts to and fro according to equilibrium relationships between the throttle pressure and the governor pressure. Thus, when vehicle road speed becomes so high in comparison with engine load that, according to such an equilibrium relationship, the governor pressure prevails over the throttle pressure, then, provided that the manual selector valve is selected by the vehicle operator to a range of speed stages which allows the engagement of overdrive speed stage (such as D range), then the direct/overdrive shift valve upshifts and selectively supplies actuating fluid pressure to the friction engaging mechanisms of the gear transmission mechanism so as to put the gear transmission mechanism into the overdrive speed stage; and, correspondingly, when engine load becomes so high in comparison with vehicle road speed that, according to such an equilibrium relationship, the throttle pressure prevails over the governor pressure, then the direct/overdrive shift valve downshifts and selectively supplies actuating fluid pressure to the friction engaging mechanisms of the gear transmission mechanism so as to put the gear transmission mechanism into the directly connected speed stage.

In the case of an automatic transmission, the gear transmission mechanism of which does not have an overdrive speed stage, and thus in which the directly connected speed stage is the highest gear stage, and the gear transmission mechanism of which further has at least one lower or reduction geared speed stage, then as an operational fact it is the case that, when the vehicle is being used in normal running conditions, the automatic transmission operates mostly in the directly coupled speed stage. In other words, if no overdrive speed stage is available from the automatic transmission, then, during usual operation of the vehicle, shifting between the directly connected speed stage and the reduction geared speed stage which is the next speed stage below the directly connected speed stage occurs rather infrequently. In fact, except during operational conditions involving deceleration of the vehicle either to the stationary state or to close to the stationary state, the operation of the vehicle is effected in a constant speed stage, i.e., the directly connected speed stage. Accordingly, wear and tear on the friction engaging mechanisms of the transmission is not very high, since the principal wearing of these friction engaging mechanisms occurs during shifting of speed stages.

On the other hand, in a conventional automatic transmission which is provided with an overdrive speed stage, the gear shift points between the overdrive speed stage and the directly coupled speed stage are conventionally located, in the shift diagram which shows the aforesaid balance relationships between throttle pressure and governor pressure as lines on a graph of engine load against vehicle speed, in a region which is frequently traversed by the point representing the actual operational conditions of the automobile. As a result, if the vehicle, as is usually the case, is not being driven at an absolutely constant road speed and engine load, frequent shifting between the directly coupled speed stage and the overdrive speed stage occurs. This causes problems and difficulties with regard to the durability of the automatic transmission, and with regard to drivability of the vehicle and the pleasure of operation thereof. In general, a hysteresis effect is provided for the direct/overdrive shift valve, i.e., in other words, at a given engine load, upshifting of this valve from the directly connected speed stage to the overdrive speed stage is arranged to occur at a somewhat higher vehicle road speed, than the speed at which downshifting of said valve from the overdrive speed stage to the directly connected speed stage is arranged to occur, as vehicle road speed decreases. However, in view of the conditions arising during actual operation of a vehicle, such a hysteresis as has been heretofore practiced has not solved the problem of instability of operation of an automatic transmission between the overdrive speed stage and the directly connected speed stage, and frequent changes of speed stage have still occurred during operation of the vehicle, accordingly causing quick wearing of the transmission, and poor durability of the automatic transmission and poor drivability of the vehicle in general.

SUMMARY OF THE INVENTION

Therefore, in view of the above outlined problem with a conventional automatic transmission provided with an overdrive speed stage, it is an object of the present invention to improve the operational characteristics of such an automatic transmission, in order to provide better durability thereof.

It is a further object of the present invention to improve the operational characteristics of the vehicle incorporating the transmission.

According to the present invention, these and other objects are accomplished by, for an automatic transmission for a vehicle comprising an engine, comprising a gear transmission mechanism and a plurality of fluid pressure actuated friction engaging mechanisms, selective supply of actuating fluid pressure to said friction engaging mechanisms providing from said gear transmission mechanism a plurality of speed stages including an overdrive speed stage, a directly connected speed stage, and a reduction geared speed stage which is the closest speed stage below the said direct speed stage: a fluid pressure control system, comprising: (a) a governor fluid pressure control valve which produces a governor fluid pressure which increases according to increase of vehicle road speed; (b) a throttle fluid pressure control valve which produces a throttle fluid pressure which increases according to increase of engine load; (c) a first shift valve, which shifts between a first state and a second state, and which, when it is in said first state, provides supply of fluid pressure to said friction engaging mechanisms so as to provide said directly connected speed stage from said gear transmission mechanism, and which, when it is in said second state, provides supply of fluid pressure to said friction engaging mechanisms so as to provide said overdrive speed stage from said gear transmission mechanism; shifting of said first shift valve from said first state to said second state, over first ranges of the throttle fluid pressure and the governor fluid pressure, occuring according to a first balance relationship between the throttle fluid pressure and the governor fluid pressure, said first shift valve remaining in said first state while the throttle fluid pressure prevails, and being shifted to said second state when the governor fluid pressure prevails; and shifting of said first shift valve from said second state to said first state, over second ranges of the throttle fluid pressure and the governor fluid pressure, occurring according to a second balance relationship between the throttle fluid pressure and the governor fluid pressure, said first shift valve remaining in said second state while the governor fluid pressure prevails, and being shifted to said first state when the throttle fluid pressure prevails; said second balance relationship being substantially different from said first balance relationship, whereby a considerable hysteresis is present in the operation of said first shift valve; and (d) a second shift valve, which shifts between a third state and a fourth state, and which, when it is in said third state, provides supply of fluid pressure to said friction engaging mechanisms so as to provide said reduction geared speed stage from said gear transmission mechanism, and which, when it is in said fourth state, provides supply of fluid pressure to said friction engaging mechanisms so as to provide said directly connected speed stage from said gear transmission mechanism; shifting of said second shift valve from said third state to said fourth state, over third ranges of the throttle fluid pressure and the governor fluid pressure, occurring according to a third balance relationship between the throttle fluid pressure and the governor fluid pressure, said second shift valve remaining in said third state while the throttle fluid pressure prevails, and being shifted to said fourth state when the governor fluid pressure prevails; and shifting of said second shift valve from said fourth state to said third state, over fourth ranges of the throttle fluid pressure and the governor fluid pressure, occurring according to a fourth balance relationship between the throttle fluid pressure and the governor fluid pressure, said second shift valve remaining in said fourth state while the governor fluid pressure prevails, and being shifted to said third state when the throttle fluid pressure prevails; said fourth balance relationship being substantially different from said third balance relationship, whereby a considerable hysteresis is present in the operation of said second shift valve; (e) in a shift diagram showing said first, second, third, and fourth balance relationships as lines on a chart of engine load against vehicle speed, the portion of the line corresponding to said second balance relationship, over said second ranges of the throttle fluid pressure and the governor fluid pressure, lying generally to the high engine load low vehicle speed side of the portion of the line corresponding to said third balance relationship, over said third ranges of the throttle fluid pressure and the governor fluid pressure; whereby, during the operation of said vehicle, said automatic transmission changes between the directly connected speed stage and the overdrive speed stage relatively infrequently, thus providing a long operating life for said friction engaging mechanisms and for said transmission as a whole.

That is to say, it is proposed that the hysteresis effect in the shift valve which shifts between the directly connected speed stage and the overdrive speed stage should be significantly increased, as compared to the performance of such a shift valve in a conventional automatic transmission equipped with an overdrive speed stage.

Particularly, it is proposed that the downshifting from overdrive speed stage to direct speed stage of this shift valve, as vehicle speed reduces at a given engine load, should be displaced towards the low vehicle speed high engine load direction in the shift diagram. The reason, according to the belief of the present inventors, that this has not been done before, is that in a conventional automatic transmission provided with an overdrive speed stage the line of downshifting from the overdrive speed stage to the directly coupled speed stage has been kept, due to rigid thinking, to the high vehicle speed low engine load side of the line of upshifting to the directly coupled speed stage from that reduction geared speed stage which is the closest speed stage below said directly connected speed stage. This prejudice, we believe, has been due to the conventional concept of the operation of an automatic transmission, in which the upshift line and the downshift line between a pair of adjacent speed stages have been mentally considered, by the developers of the prior art, in unison. In other words, for example, with regard to the shift diagram showing these shifts as lines on a graph of engine load against vehicle speed, the combination of the shift line for upshifting from the first speed stage to the second speed stage and the shift line for downshifting from the second speed stage to the first speed stage has been considered as located at a region of relatively low vehicle speed in the shift diagram; the combination of the shift line for upshifting from the second speed stage to the third or directly connected speed stage and the line for downshifting from the third or directly connected speed stage to the second speed stage has been visualized as lying in an intermediate vehicle speed region of the shift diagram, and entirely to the high vehicle speed side of the abovementioned combination; and the combination of the line for upshifting from the third or directly connected speed stage to the fourth or overdrive speed stage and the line for downshifting from the fourth or overdrive speed stage to the third or directly connected speed stage has been visualized as lying in a high vehicle speed region of the shift diagram, entirely to the high vehicle speed side of the second (and also the first) abovementioned combination. In other words, no overlapping of these combinations of lines has been heretofore considered, by the developers of the prior art.

However, the inventors of the present invention have transcended this conventional concept, and have accepted the possibility of overlapping of these shift line combinations. In other words, the inventors of the present invention, in order to desirably increase the hysteresis effect between upshifting from the directly connected speed stage to the overdrive speed stage and downshifting from the overdrive speed stage to the directly connected speed stage, i.e., the hysteresis effect of the direct/overdrive speed shift valve, which, as explained above, is strongly desired, in order to reduce the frequency of shifting between the directly connected speed stage and the overdrive speed stage and to improve the durability of the transmission and the drivability of the vehicle incorporating it, have conceived that there is no real objection in principle for the portion of the downshift line from the overdrive speed stage to the directly connected speed stage which corresponds to a balance between throttle pressure and governor pressure to lie generally to the low vehicle speed high engine load side of the portion of the upshift line from the reduction geared speed stage which is the closest speed stage below the directly connected speed stage to the directly connected speed stage which corresponds to an equilibrium relationship between throttle pressure and governor pressure.

Further, by practicing this invention, the inventors of the present invention have found the following facts. First, it is thus possible greatly to extend the usual operational region of the overdrive speed stage of such an automatic transmission. Second, this can be done without substantially deteriorating the acceleration characteristics of the vehicle. Third, by doing this the fuel consumption of the vehicle is markedly decreased. Fourth, by doing this the frequency of shifting to and fro between the directly coupled speed stage and the overdrive speed stage of the transmission is greatly reduced, and accordingly the durability of the friction engaging mechanisms of the automatic transmission is greatly improved.

Further, according to a particular detailed characteristic of the present invention, it is proposed that said first shift valve should comprise a bore and a valve element axially slidable to and fro within said bore between a first position and a second position, said first shift valve being in said first state when said valve element is in said first position, and being in said second state when said valve element is in said second position; and first and second input ports to which are respectively supplied said throttle pressure and said governor fluid pressure, said throttle pressure biasing said valve element towards said first position, and said governor pressure biasing said valve element towards said second position; the effective pressure receiving area via which said governor fluid pressure acts upon said valve element being substantially greater when said valve element is in said second position, than when said valve element is in said first position; whereby said substantial difference between said second balance relationship and said first balance relationship, with relation to the operation of said first shift valve, is provided, and accordingly said hysteresis in the operation of said first shift valve is provided, by the force due to the governor pressure acting on said valve element in a direction to urge it towards said second position being substantially greater, when said valve element is in said second position, than when said valve element is in said first position; and, further, that said valve element should comprise a first land and a second land whose cross sectional area is substantially smaller than said first land, and said bore should comprise a first mating portion for slidably mating with said first land and a second mating portion for slidably mating with said second land; said governor fluid pressure, when said valve element is in said first position, passing between said first land and said first mating portion to bear upon said second land which is slidably mated with said second mating portion, but, when said valve element is in said second position, said first land slidably mating with said first mating portion, and said governor fluid pressure bearing upon said first land; whereby the aforesaid variation in the effective pressure receiving area, via which said governor pressure acts on said valve element, when said valve element moves between its said first and second positions, is provided.

According to such a construction, the basic idea of the present invention, that is, to substantially increase the hysteresis in the operation of the direct/overdrive shift valve, to such an extent that the downshift line from the overdrive speed stage to the directly connected speed stage comes to be on the low vehicle speed high engine load side of the upshift line from the reduction geared speed stage which is the closest speed stage below the directly connected speed stage to the directly connected speed stage, is implemented via a simple construction involving the areas of lands of the valve element to the direct/overdrive shift valve.

BRIEF DESCRIPTION OF THE DRAWINGS

The present invention will become more fully understood from the following description of a preferred embodiment thereof, which is to be taken in conjunction with the accompanying drawings. It should be clearly understood, however, that the description of the embodiment, and the drawings, are all of them provided purely for the purposes of illustration and exemplification only, and are in no way to be taken as limitative of the scope of the present invention. In the drawings.

DESCRIPTION OF THE PREFERRED EMBODIMENT

Figure 2:
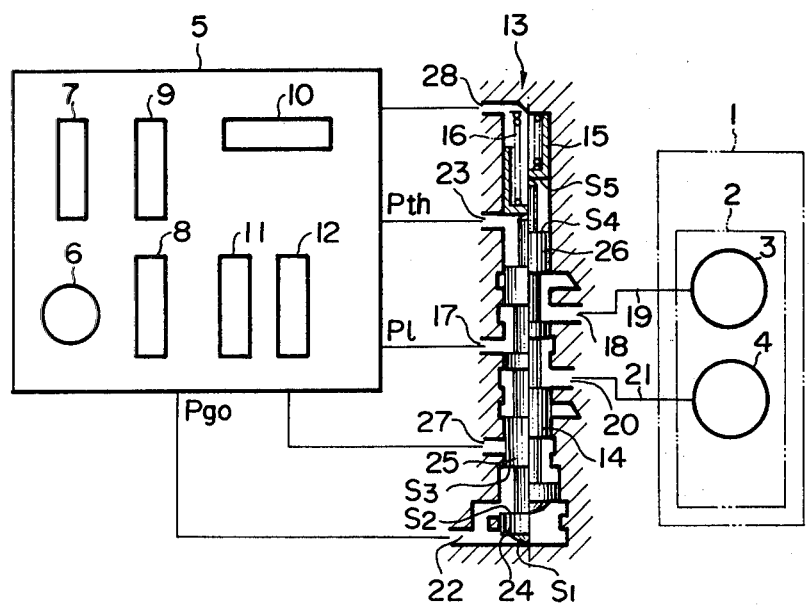
FIG. 2 is a partly schematic view showing a fluid pressure control system which is a preferred embodiment of the present invention, and also showing an automatic transmission which is controlled by this fluid pressure control system; parts of both the fluid pressure control system and of the automatic transmission which are per se well known and conventional being shown in a block diagram form for the purposes of convenience of explanation.

In FIG. 2, an automatic transmission designated by reference numeral 1 is shown in schematic block diagram form, and there is also shown a fluid pressure control system which is a preferred embodiment of the fluid pressure control system according to the present invention, and which controls this automatic transmission 1. Parts of the automatic transmission 1 and of the preferred embodiment of the present invention, the constructions of which are per se well known and conventional, are shown in block diagram form in FIG. 2 for the purposes of simplicity.

The automatic transmission 1 comprises a gear transmission mechanism 2 which includes an overdrive mechanism, in a per se well known fashion. Two of a plurality of friction engaging mechanisms comprised within the automatic transmission 1 are shown in block diagram form, and are designated by the reference numerals 3 and 4. The automatic transmission 1, by selective engagement and disengagement of various ones of the aforesaid plurality of friction engaging mechanisms including the mechanisms 3 and 4, is shiftable to any one of a plurality of speed stages, including an overdrive speed stage, a directly connected speed stage, and a reduction geared speed stage which is the closest speed stage below said directly connected speed stage. In fact, the automatic transmission 1 in connection with which the present invention is being exemplarily illustrated is also shiftable to another reduction geared speed stage which is the lowest geared speed stage. In the following description, these speed stages of the shown automatic transmission 1 will be referred to as the 1st speed stage, the 2nd speed stage, the 3rd speed stage or the directly connected speed stage, and the 4th speed stage or the overdrive speed stage.

The plurality of friction engaging mechanisms including the friction engaging mechanisms 3 and 4 are operated by selective supply of actuating fluid pressure thereto, provided by the fluid pressure control system according to the present invention. In particular, the friction engaging mechanisms 3 and 4 are those concerned with the upshifting and downshiting between the directly connected speed stage and the overdrive speed stage. In more detail, when actuating fluid pressure is supplied to the friction engaging mechanism 3, and actuating fluid pressure is not supplied to the friction engaging mechanism 4, then the gear transmission mechanism 2 is set to the 3rd or the directly coupled speed stage. On the other hand, when actuating fluid pressure is supplied to the friction engaging mechanism 4, and actuating fluid pressure is not supplied to the friction engaging mechanism 3, then the gear transmission mechanism 2 is set to the 4th or the overdrive speed stage.

Selective supply of actuating fluid pressures to the friction engaging mechanisms including the mechanisms 3 and 4 is provided by the fluid pressure control system according to the present invention. This comprises a fluid pressure control circuit 5, the component parts of which are individually per se well known according to various kinds of constructions, and also comprises a direct/overdrive shift valve 13 of a novel construction. The per se individually well known components of the fluid pressure control circuit 5 includes: a hydraulic fluid pressure pump 6, a line fluid pressure control valve 7, a governor fluid pressure control valve 8, a throttle fluid pressure control valve 9, a manual selector valve 10, a 1st/2nd shift valve 11, and a 2nd/3rd shift valve 12. The fluid pressure pump 6 provides a supply of pressurized hydraulic fluid which acts as a power source for the fluid pressure control system. The line fluid pressure control valve 7 regulates a supply of fluid pressure from the pump 6 to produce a controlled line fluid pressure. The governor fluid pressure control valve 8 receives input of said line fluid pressure and produces as an output a governor fluid pressure which increases according to increase of the road speed of the vehicle to which this transmission is fitted. The throttle fluid pressure control valve 9 receives input of said line fluid pressure and produces as an output a throttle fluid pressure which increases according to increase of the load on the engine of the vehicle to which this transmission is fitted; in the case of an engine incorporating a carburetor, this throttle fluid pressure control valve regulates its output pressure according to the throttle opening of the carburetor, which is taken as a parameter representative of the load upon the engine. The manual selector valve 10 is manually shiftable by hand by the driver of the vehicle between a plurality of positions which represent ranges of speed stages for the automatic transmission.

The 1st/2nd shift valve 11 shifts to and fro between two positions, according to a balance relationship (which incorporates a certain hysteresis) between the throttle pressure and the governor pressure, and this shifting thereof provides selective supply of actuating hydraulic fluid pressure to friction engaging mechanisms in the automatic transmission 1 which engage either the 1st speed stage or the 2nd speed stage. The 2nd/3rd shift valve 12 shifts to and fro between two positions, according to another balance relationship (which again incorporates a certain hysteresis) between the throttle pressure and the governor pressure, and this shifting thereof provides selective supply of actuating hydraulic fluid pressure to friction engaging mechanisms in the automatic transmission 1 which engage either the 2nd speed stage or the directly connected or 3rd speed stage. Further, the direct/overdrive shift valve 13 shifts to and fro between two positions, according to yet another balance relationship (which again incorporates a certain degree of hysteresis) between the throttle pressure and the governor pressure, and this shifting thereof provides selective supply of actuating hydraulic fluid pressure to friction engaging mechanisms in the automatic transmission 1 which engage either the directly connected or 3rd speed stage or the overdrive or 4th speed stage.

Figure 1:
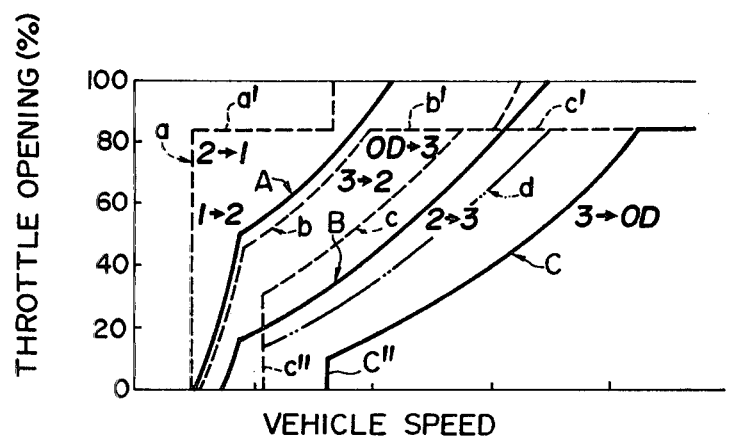
FIG. 1 is a shift diagram, in which vehicle speed is the abscissa, and throttle opening (i.e. engine load) is the ordinate, showing upshift and downshift lines between the first speed stage, the second speed stage, the directly connected or third speed stage, and the overdrive speed stage of an automatic transmission equipped with a fluid pressure control system according to the present invention, and also showing, for comparison, a downshift line from the overdrive speed stage to the directly connected speed stage, according to a conventional prior art.

In FIG. 1, which is a shift diagram showing vehicle speed as the abscissa against engine load as the ordinate, i.e. which is equivalent to a diagram of governor pressure as the abscissa against throttle pressure as the ordinate, there are shown the upshift and downshift lines for the 1st/2nd shift valve 11, the 2nd/3rd shift valve 12, and the direct/overdrive shift valve 13. The lines A, B, and C are upshift lines, and the lines a, b, and c are downshift lines. In more detail, the solid line A is the upshift line of the 1st/2nd shift valve 11 from the 1st speed stage to the 2nd speed stage, the solid line B is the upshift line of the 2nd/3rd shift valve 12 from the 2nd speed stage to the 3rd speed stage (which is the directly connected speed stage), and the solid line C is the upshift line of the direct/overdrive shift valve 13 from the 3rd speed stage to the overdrive speed stage. Further, the broken line a is the downshift line of the 1st/2nd shift valve 11 from the 2nd speed stage to the 1st speed stage, the broken line b is the downshift line of the 2nd/3rd shift valve 12 from the 3rd speed stage to the 2nd speed stage, and the broken line c is the downshift line of the direct/overdrive shift valve 13 from the overdrive speed stage to the directly connected or 3rd speed stage.

The downshift lines a, b, and c have horizontal portions a', b' and c' in the high throttle opening region. This shows the per se well known operation of so called "kickdown". Further, the low throttle opening region of the downshift line c between the overdrive speed stage and the 3rd speed stage is vertical, and the reason for this is due to the fact that the shifting of the direct-/overdrive shift valve 13 is biased by a compression coil spring 16, as will be explained later.

Particularly according to the present invention, as will be readily apparent from FIG. 1, the hysteresis characteristic of the direct/overdrive shift valve 13 is very pronounced, and is much greater than in the prior art, as will be seen from the fact that the broken line c is widely separated from the solid line C. Particularly according to the present invention, this hysteresis characteristic is in fact so pronounced that the downshift line c of the direct/overdrive shift valve 13 from the overdrive speed stage to the 3rd or the directly connected speed stage lies, in the shift diagram shown in FIG. 1, generally to the high engine load low vehicle speed side of the solid line B which shows the upshifting characteristic of the 2nd/3rd shift valve 12 from the second speed stage to the third or the directly connected speed stage. This condition, of course, does not relate to the portion c' of the downshift line c of the direct/overdrive shift valve 13 from the overdrive speed stage to the 3rd speed stage which is horizontal, nor to its portion c" which is vertical, but only relates to the sloping and curved portion of the downshift line c, i.e. to that portion thereof which relates to those ranges of vehicle road speed and engine load over which the operation of the direct/overdrive shift valve 13 is governed by a balance relationship between the throttle pressure and the governor pressure. The same is true for the relation of this condition to the upshift line B which shows the upshifting characteristic of the 2nd/3rd shift valve 12 from the 2nd speed stage to the 3rd speed stage; i.e., this condition does not relate to that part B' of said upshift line B which is horizontal, nor to its portion B" which is vertical, but only relates to the sloping and curved portion of the upshift line B, i.e. to that portion thereof which relates to those ranges of vehicle road speed and engine load over which the operation of the 2nd/3rd shift valve 12 is governed by a balance relationship between the throttle pressure and the governor pressure. According to this particular inventive concept, which, as has been described above, results from the realisation by the present inventors that it is not necessary to conceive of the pairs of lines A and a, B and b, and C and c as indivisible combinations which cannot be overlapped, thereby the hysteresis region between the lines C and c can be made sufficiently large to ensure infrequent shifting of the automatic transmission 1 between is overdrive speed stage and its directly connected speed stage, without however unduly deteriorating performance of the vehicle to which the transmission is fitted, or its drivability. Thus, the reliability of the automatic transmission 1 may be much improved.

The double dotted chain line d in FIG. 1 is an example of the sort of downshift line of a direct/overdrive shift valve from the overdrive speed stage to the third speed stage that has been practiced in the prior art. This line d is generally on the high vehicle speed low engine load side of the line B which is also considered as showing upshifting of a corresponding conventional 2nd/3rd shift valve from the 2nd speed stage to the 3rd or directly connected speed stage. Accordingly, as is clear from FIG. 1, the hysteresis region available in the prior art between the upshift line C from the 3rd speed stage to the overdrive speed stage, and the downshift line d from the overdrive speed stage to the 3rd speed stage, is relatively narrow, and accordingly frequent shifting between the overdrive speed stage and the directly connected speed stage has occurred in the prior art.

In FIG. 2, there is shown the overdrive shift valve 13, which provides such a relatively wide hysteresis region between upshifting from the directly connected speed stage to the overdrive speed stage, and downshifting from the overdrive speed stage to the directly connected speed stage. This direct/overdrive shift valve 13 comprises a valve element 14 which reciprocates upwards and downwards in the drawing within a bore formed in a housing. Coaxial with the valve element 14, and above it in FIG. 2, there reciprocates within the bore a piston 15, which is biased downwards in the drawing by a compression coil spring 16.

Line fluid pressure is supplied to a port 17 of the direct/overdrive shift valve 13 from the fluid pressure control circuit 5, and supply thereof is selectively made, according to the position of the valve element 14, to the friction engaging device 3 or to the friction engaging device 4. In more detail, when the valve element 14 is in its downwardly shifted position, as shown on the left hand side of the central axis of the shift valve 13 in FIG. 2, then the line pressure P1 supplied to its port 17 is supplied to the friction engaging device 3 via its port 18 and a fluid conduit 19, and is not supplied to the friction engaging device 4, and accordingly the gear transmission mechanism 2, as explained above, is set to the 3rd or the directly coupled speed stage. On the other hand, when the valve element 14 is shifted to its upward position, as shown on the right hand side of the central axis of the shift valve 13 in FIG. 2, then the line pressure which is supplied to the port 17 is instead supplied to the friction engaging device 4 via its output port 20 and a fluid conduit 21, and is not supplied to the friction engaging device 3, and as explained above thereby the gear transmission mechanism 2 is set to the overdrive speed stage.

The governor fluid pressure Pgo, generated as explained above according to the current road speed of the vehicle by the governor fluid pressure regulation valve 8, is supplied to a port 22 of the direct/overdrive shift valve 13, and the throttle pressure Pth, generated as described above according to the current load on the engine of the vehicle by the throttle fluid pressure regulation valve 9, is supplied to a port 23 of the direct/overdrive shift valve 13.

The port 23 to which the throttle fluid pressure Pth is supplied is communicated to a chamber at the upper end in FIG. 2 of the valve element 14, just below the piston 15. Accordingly, this throttle pressure impels the piston 15 upwards in the drawing acting over an effective pressure receiving area $S_5$ on the lower end of the piston 15, and also impels the valve element 14 in the downwards direction in the figure, acting on an effective pressure receiving area $S_4$ at the top end of the valve element 14, above the land 26 thereof, said area being in fact the total cross sectional area of the bore of the direct/overdrive shift valve 13 at this axial position therealong. Thus, a force whose magnitude is Pth×$S_4$ is applied in the downwards direction in FIG. 2 to the valve element 14. It should thus be noted that the effective pressure receiving area of the valve element 14, with respect to the throttle fluid pressure Pth supplied to the port 23, is constant and is always equal to $S_4$.

On the other hand, the governor fluid pressure Pgo which is supplied to the port 22 of the direct/overdrive shift valve 13 impels the valve element 14 thereof in the upwards direction in FIG. 2, but the effective pressure receiving area of this valve element 14 with respect to this governor pressure Pgo varies, according to the position of the valve element 14 within its bore. In more detail, the lower end of the valve element 14 is provided with a large land 24, the total cross sectional area of which is $S_1$, said land 24 cooperating with and mating to a corresponding section of the bore of the valve 13, only when the valve element 14 is in its upwardly displaced position within its bore. On the other hand, somewhat above the first land 24 there is formed on the valve element 14 a second land 25, which provides a lower annular pressure receiving face having effective pressure receiving area $S_3$, which is substantially smaller than the effective pressure receiving area $S_2$ of an upper annular pressure receiving face of the land 24. This land 25 cooperates and mates with a corresponding portion of the bore of the valve 13, when the valve element 14 is in its downwardly biased position, as shown on the left hand side of the axis of the valve 13 in FIG. 2. Thus, when the valve element 14 is in its downwardly biased position as shown on the left hand side of the valve 13 in the figure, the governor pressure Pgo supplied to the port 22 acts on the valve element 14 via an effective pressure receiving area equal to $S_1-S_2+S_3$, or the cross sectional area of the smaller land 25. Since, as seen in FIG. 2, $S_2$ is smaller than $S_3$, this effective area $S_1-S_2+S_3$ is smaller than $S_1$, which is the effective pressure receiving area when the valve element 14 is in its upwardly shifted position, as shown on the right hand side of the axis of the valve 13 in FIG. 2.

To a port 28 of the direct/overdrive shift valve 13 which is located above the piston 15 thereof, there is supplied from the fluid pressure control circuit 5 a holddown fluid pressure, which is present when the manual selector valve 10 is shifted to any range other than D range. If this holddown pressure is present, the piston 15 is compulsorily biased downwards in the drawing, thereby compulsorily holding the valve element 14 in its downward position as shown on the left hand side of the figure and thereby supplying the line pressure which is supplied to the input port 17, via the port 18 and the fluid conduit 19, to the friction engaging device 3, and not to the friction engaging device 4, so as to prevent the automatic transmission 1 from being set to the overdrive speed stage. Further, to an input port 27 of the direct/overdrive shift valve 13 is provided from the fluid pressure control circuit 5 a kickdown pressure, which is present when the load on the engine of the vehicle exceeds a certain value, i.e., referring to FIG. 1 illustrating the operation of the shown embodiment, when the throttle opening of the vehicle is greater than, e.g., 80%. When this kickdown pressure is present at the port 27, if the valve element 14 is in the upwardly biased position as shown on the right hand side of the drawing, then this pressure acts on the upper side of the land 24, and is sufficiently strong to positively bias the valve element 14 in the downwards direction in the drawing, so as to kick down the automatic transmission from the overdrive speed stage to the directly connected speed stage. The functions and operations of the above described holddown pressure and this kickdown pressure are not relevant to the present invention, and therefore will not be further discussed here.

The operation of this fluid pressure control system will now be described, assuming that the vehicle starts from the rest condition. As the vehicle road speed gradually increases, in a per se well known way the automatic transmission 1 is first shifted to the 1st speed stage, and then, according to the 1st speed stage—2nd speed stage upshift line A, the automatic transmission 1 shifts to its 2nd speed stage, by the operation of the 1st/2nd shift valve 11. As the vehicle road speed further increases, according to the 2nd speed stage—3rd speed stage upshift line B, the automatic transmission 1 shifts to its 3rd speed stage, by the operation of the 2nd/3rd shift valve 12, again in a per se well known way. At this time, because the governor fluid pressure Pgo is relatively low, the valve element 14 of the direct/overdrive speed shift valve 13 is in its downwardly biased position as shown in FIG. 2. Accordingly, the effective pressure receiving area available for the governor fluid pressure Pgo supplied to the port 22 of the shift valve 13 is equal to the smaller area $(S_1-S_2+S_3)$. Now, if the throttle opening, i.e., the engine load, is less than a certain critical value, then, because the throttle fluid pressure Pth supplied to the port 23 of the direct/overdrive shift valve 13 is not yet sufficient to bias the piston 15 upwards in the drawing out of contact with the valve element 14, thereby the net effect of this throttle fluid pressure Pth on the contacted combination of the piston 15 and the valve element 14 will be zero, and accordingly the shifting upwards and downwards of this combination will be determined by a balance between the governor pressure Pgo as supplied to the port 22, and the compression force of the compression coil spring 16. Thus, in this operational region, the upshift line provided by the direct/overdrive shift valve 13 from the directly connected speed stage to the overdrive speed stage is as illustrated by the solid line C″ in FIG. 1, i.e., the upshift characteristic is independent of throttle opening in this low throttle opening region. On the other hand, if the throttle fluid pressure Pth is higher than this aforesaid critical amount, then it biases the piston 15 in the upwards direction in FIG. 2 away from its contact with the valve element 14. Accordingly, thenceforth, the valve element 14 is reciprocated between its upwards and downwards positions within its bore in accordance with balance relationships between the throttle fluid pressure Pth supplied to the port 23 and the governor fluid pressure Pgo supplied to the port 22.

In more detail, assuming that the throttle fluid pressure is above said predetermined value, so that the piston 15 is biased upwards within the bore out of contact with the valve element 14, and thus this piston is not further concerned with the operation of the shift valve 13, if the valve element 14 is in its downwardly shifted position in its bore, as shown on the left hand side of FIG. 2, then its motion within the bore is determined by a first balance relationship between the throttle fluid pressure Pth supplied to the port 23, which acts via the effective pressure receiving area $S_4$, and the governor fluid pressure Pgo supplied to the port 22, which acts via the effective pressure receiving area $(S_1-S_2+S_3)$. On the other hand, when the valve element 14 is in its upwardly shifted position within its bore, as shown on the right hand side of FIG. 2, then its motion within the bore is determined by a second balance relationship between the throttle fluid pressure Pth supplied to the port 23, which acts via the same pressure receiving area $S_4$, and the governor fluid pressure Pgo supplied to the port 22, which acts via a substantially larger effective pressure receiving area $S_1$ than the previous pressure receiving area $(S_1-S_2+S_3)$ available to it. Accordingly, while the effective pressure receiving area for the throttle fluid pressure Pth remains constant, the effective pressure receiving area for the govenor fluid pressure Pgo is greater, when the automatic transmission 1 is in the overdrive speed stage, than when the automatic transmission 1 is in the directly connected speed stage. As will be clear to one skilled in the art, based upon the foregoing explanation, this will provide a hysteresis effect between the upshifting from the directly connected speed stage to the overdrive speed stage, and the downshifting from the overdrive speed stage to the directly connected speed stage; in other words, once the automatic transmission has been shifted to the overdrive speed stage, it will not shift down to the directly connected speed stage at the same speed at which it was upshifted, but only at a substantially lower speed.

The magnitude of this hysteresis effect is governed by the ratio between the areas $S_1$ and $(S_1-S_2+S_3)$, in other words by the ratio of the cross sectional areas of the lands 24 and 25. As has been explained above, the difference in the cross sectional areas of these lands is made relatively large, so that the spacing between the upshift line C in FIG. 1 showing upshifting by the direct/overdrive shift valve 13 from the directly connected speed stage to the overdrive speed stage, and the downshift line c showing downshifting by said direct/overdrive shift valve 13 from the overdrive speed stage to the directly connected speed stage, should be considerable. Indeed, according to the present invention, as explained above, this separation between these lines is thus made so great that the downshift line c is moved to the high throttle opening low vehicle speed side of the upshift line B which shows upshifting by the 2nd/3rd shift valve 12 from the 2nd speed stage to the 3rd or the directly connected speed stage.

It will be easily understood by one skilled in the art that, by suitably tailoring the size of the lands 24 and 25, any desired amount of hysteresis can be easily built into the direct/overdrive shift valve 13.

In the case of downshifting from the overdrive speed stage to the directly connected speed stage, when the throttle pressure is lower than said predetermined amount, then the piston 15 will be in contact with the valve element 14, according to the action of the compression coil spring 16 which overcomes the effect of the throttle pressure Pth supplied to the port 23, and accordingly the combination of the contacted piston 15 and valve element 14 will not be affected by the throttle fluid pressure Pth, and downshifting from overdrive speed stage to the directly connected speed stage will be governed by a balance relationship between the force due to the governor fluid pressure Pgo supplied to the port 22, acting on the large pressure receiving area $S_1$ which is the cross sectional area of the land 24, and the compression force of the compression coil spring 16. Accordingly, the downshift line in this condition is as shown by the line c″ in FIG. 1, which is vertical, and indicates that the downshifting from the overdrive speed stage to the directly connected speed stage does not depend upon throttle opening within this range of throttle opening.

Of course, as per se well known, the operation of the 2nd/3rd shift valve 12 is also governed by equilibrium relationships between the throttle pressure Pth and the governor pressure Pgo, again with a hysteresis effect as shown by the upshift line B from the 2nd speed stage to the 3rd speed stage and the downshift line b from the 3rd speed stage to the 2nd speed stage in FIG. 1; this hysteresis effect may be produced in any one of a variety of per se well known ways, or according to the same system as shown for the direct/overdrive valve in FIG. 2.

Thus, according to the present invention, it is possible greatly to improve the operational characteristics of the automatic transmission 1. Further, by the practice of the present invention, the durability of the automatic transmission 1 is greatly increased, because shifting thereof between the directly connected speed stage and the overdrive speed stage is substantially reduced. Also, fuel consumption of the vehicle is much improved.

Although the present invention has been shown and described in terms of a preferred embodiment thereof, and in language more or less specific with regard to structural features thereof, and with reference to the illustrative drawings, it should be understood that in any particular embodiment of the present invention various changes, modifications, and omissions of the form and the detail thereof could be made by a person skilled in the art, without departing from the essential scope of the invention.

I claim:

1. For an automatic transmission for a vehicle comprising an engine, comprising a gear transmission mechanism and a plurality of fluid pressure actuated friction engaging mechanisms, selective supply of actuating fluid pressure to said friction engaging mechanisms providing from said gear transmission mechanism a plurality of speed stages including an overdrive speed stage, a directly connected speed stage, and a reduction geared speed stage which is the closest speed stage below the said direct speed stage:

a fluid pressure control system, comprising:

(a) a governor fluid pressure control valve which produces a governor fluid pressure which increases according to increase of vehicle road speed;

(b) a throttle fluid pressure control valve which produces a throttle fluid pressure which increases according to increase of engine load;

(c) a first shift valve, which shifts between a first state and a second state, and which, when it is in said first state, provides supply of fluid pressure to said friction engaging mechanisms so as to provide said directly connected speed stage from said gear transmission mechanism, and which, when it is in said second state, provides supply of fluid pressure to said friction engaging mechanisms so as to provide said overdrive speed stage from said gear transmission mechanism; shifting of said first shift valve from said first state to said second state, over first ranges of the throttle fluid pressure and the governor fluid pressure, occurring according to a first balance relationship between the throttle fluid pressure and the governor fluid pressure, said first shift valve remaining in said first state while the throttle fluid pressure prevails, and being shifted to said second state when the governor fluid pressure prevails; and shifting of said first shift valve from said second state to said first state, over second ranges of the throttle fluid pressure and the governor fluid pressure, occurring according to a second balance relationship between the throttle fluid pressure and the governor fluid pressure, said first shift valve remaining in said second state while the governor fluid pressure prevails, and being shifted to said first state when the throttle fluid pressure prevails; said second balance relationship being substantially different from said first balance relationship, whereby a considerable hysteresis is present in the operation of said first shift valve; and (d) a second shift valve, which shifts between a third state and a fourth state, and which, when it is in said third state, provides supply of fluid pressure to said friction engaging mechanisms so as to provide said reduction geared speed stage from said gear transmission mechanism, and which, when it is in said fourth state, provides supply of fluid pressure to said friction engaging mechanisms so as to provide said directly connected speed stage from said gear transmission mechanism; shifting of said second shift valve from said third state to said fourth state, over third ranges of the throttle fluid pressure and the governor fluid pressure, occurring according to a third balance relationship between the throttle fluid pressure and the governor fluid pressure, said second shift valve remaining in said third state while the throttle fluid pressure prevails, and being shifted to said fourth state when the governor fluid pressure prevails; and shifting of said second shift valve from said fourth state to said third state, over fourth ranges of the throttle fluid pressure and the governor fluid pressure, occurring according to a fourth balance relationship between the throttle fluid pressure and the governor fluid pressure, said second shift valve remaining in said fourth state while the governor fluid pressure prevails, and being shifted to said third state when the throttle fluid pressure prevails; said fourth balance relationship being substantially different from said third balance relationship, whereby a considerable hysteresis is present in the operation of said second shift valve;

(e) in a shift diagram showing said first, second, third, and fourth balance relationships as lines on a chart of engine load against vehicle speed, the portion of the line corresponding to said second balance relationship, over said second ranges of the throttle fluid pressure and the governor fluid pressure, lying generally to the high engine load low vehicle speed side of the portion of the line corresponding to said third balance relationship, over said third ranges of the throttle fluid pressure and the governor fluid pressure; whereby, during the operation of said vehicle, said automatic transmission changes between the directly connected speed stage and the overdrive speed stage relatively infrequently, thus providing a long operating life for said friction engaging mechanisms and for said transmission as a whole.

2. A fluid pressure control system according to claim 1, wherein said first shift valve comprises a bore and a valve element axially slidable to and fro within said bore between a first position and a second position, said first shift valve being in said first state when said valve element is in said first position, and being in said second state when said valve element is in said second position; and first and second input ports to which are respectively supplied said throttle pressure and said governor fluid pressure, said throttle pressure biasing said valve element towards said first position, and said governor pressure biasing said valve element towards said second position; the effective pressure receiving area via which said governor fluid pressure acts upon said valve element being substantially greater when said valve element is in said second position, than when said valve element is in said first position; whereby said substantial difference between said second balance relationship and said first balance relationship, with relation to the operation of said first shift valve, is provided, and accordingly said hysteresis in the operation of said first shift valve is provided, by the force due to the governor pressure acting on said valve element in a direction to urge it towards said second position being substantially greater, when said valve element is in said second position, than when said valve element is in said first position.

3. A fluid pressure control system according to claim 2, wherein said valve element comprises a first land and a second land whose cross sectional area is substantially smaller than said first land, and said bore comprises a first mating portion for slidably mating with said first land and a second mating portion for slidably mating with said second land; said governor fluid pressure, when said valve element is in said first position, passing between said first land and said first mating portion to bear upon said second land which is slidably mated with said second mating portion, but, when said valve element is in said second position, said first land slidably mating with said first mating portion, and said governor fluid pressure bearing upon said first land; whereby the aforesaid variation in the effective pressure receiving area, via which said governor pressure acts on said valve element, when said valve element moves between its said first and second positions, is provided.

* * * * *